United States Patent [19]

Davis, Jr. et al.

[11] 4,289,537

[45] Sep. 15, 1981

[54] METHOD OF PRODUCING CEMENT

[75] Inventors: Howard F. Davis, Jr., Pittsburgh; John A. Persson, Gibsonia, both of Pa.

[73] Assignee: Lectromelt Corporation, Pittsburgh, Pa.

[21] Appl. No.: 127,556

[22] Filed: Mar. 6, 1980

[51] Int. Cl.$^3$ .............................................. C04B 7/32
[52] U.S. Cl. .................................................. 106/100
[58] Field of Search ....................... 106/100, 101, 103; 432/13

[56] References Cited

U.S. PATENT DOCUMENTS 4,213,791  7/1980  Wilson ................................ 106/100

OTHER PUBLICATIONS

Robson, High-Alumina Cements and Concretes, John Wiley & Sons, NY, NY, 1962, pp. 17, 18, 25 (Sci. Lib. TA 435 R. 6).

Primary Examiner—James Poer
Attorney, Agent, or Firm—Fred Wiviott

[57] ABSTRACT

Tricalcium silicate materials useful in the production of Portland and other cements are prepared by melting a mixture of materials comprising basically line and silica in an electric furnace. The voltage between the electrodes and the conductivity of the melt are controlled so that a predetermined separation will be maintained between the lower end of the carbon electrode and the melt.

8 Claims, 1 Drawing Figure

U.S. Patent  Sep. 15, 1981  4,289,537
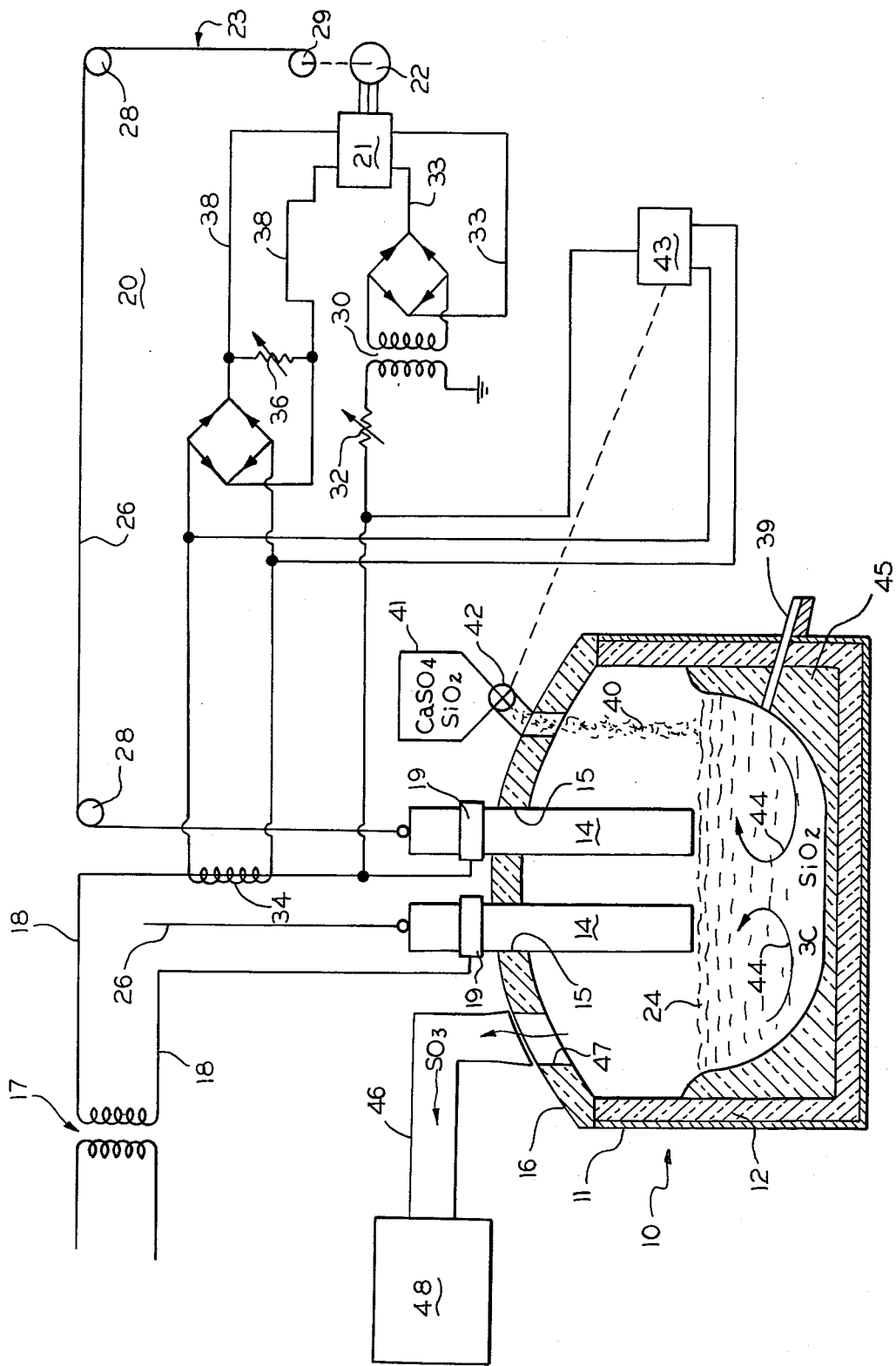

METHOD OF PRODUCING CEMENT

BACKGROUND OF THE INVENTION

This invention relates to the production of tricalcium silicate useful in the manufacture of Portland and other cements and in particular the manufacture of such materials in electric arc furnaces.

Portland cement is commonly prepared from certain indefinite compounds of lime, silica, alumina, iron oxide, magnesium oxide and smaller quantities of other oxides. The raw materials useful in the preparation of Portland cement include cement rock, limestone, marl, clay and shale, blast-furnace slag, and gypsum sand. One common method for preparing Portland cement comprises the crushing or grinding of the raw materials into a powder which is then processed in dry form or as a slurry. The mixture of raw materials is placed in a rotary kiln for calcinization and burning into clinker. Temperatures of about 2800° F. are typically used at the hottest heating zone near the discharge end of the kiln. Following heating, the clinker is air-cooled, pulverized and blended with various chemicals added to modify performance or setting time and then bagged or otherwise stored for use. This method is not wholly satisfactory because it requires a large amount of energy and controlling the composition of the final product is relatively difficult.

OBJECTS OF THE INVENTION

It is a primary object of the present invention to provide a new and improved method of making Portland cement clinker.

Another object of the present invention is to provide a method of manufacturing Portland cement clinker in an electric arc furnace.

Yet another object of the invention is to provide a method of manufacturing Portland cement clinker in an electric arc furnace wherein electrical parameters are controlled to prevent contamination of the melt with carbon from the electrodes.

How these and other objects and advantages of the present invention are accomplished will be described in the following specification taken in conjunction with the drawing.

In general, the invention comprises a process which includes the steps of charging a mixture of pre-reduced furnace slag and lime into an electric arc furnace having at least two carbon electrode, energizing the electrode to maintain a temperature in the furnace of about 3200° F. to maintain the conductivity of the melt at about 175 mho/meter. Preferably, the process is continuous with the molten product being tapped for cooling and the feed rate of material to the furnace being at a rate which does not lower the temperature below 3200° F. or extinguish the arc.

BRIEF DESCRIPTION OF THE DRAWING

The single FIGURE of the drawing schematically illustrates an electric arc furnace in which the method of the invention may be practiced.

DESCRIPTION OF THE PREFERRED EMBODIMENT

The single FIGURE of the drawing schematically illustrates an electric arc furnace 10 in which cement clinker may be produced according to the method of the present invention. In general terms, electric furnace 10 includes a metallic shell 11 and refractory lining 12. A plurality of electrodes 14, which are essentially carbon may be of the prebaked or self-baking type, extend through suitable openings 15 in the arched roof 16 of furnace 10. While two electrodes 14 are shown, any suitable number may be employed. The electrodes 14 may be energized from any conventional source, symbolized by the single phase, alternating current transformer 17 which is coupled by a pair of conductors 18 to the electrode clamps 14 of each electrode. Those skilled in the art will appreciate that each clamp 14 will include conductive members for engaging the electrode surface whereby electric current may be transferred readily therebetween.

Each electrode 14 is supported for vertical movement relative to the furnace 10 in any suitable manner such as by means of a schematically illustrated positioning mechanism 20 which includes a control 21, a positioning motor 22 and a cable assembly 23. As will be discussed more fully below, the control mechanism 21 is operative to sense electrode current and voltage and to provide control signals to motor 22 which, in turn, adjusts cable assembly 23 so that its associated electrode 14 is adjusted vertically. In this manner, the electrodes 14 are positioned at the desired distance from molten bath 24 within the furnace 10. While only a single control 21, motor 22 and cable mechanism 23 is shown to be connected to one of the electrodes 14, it will be appreciated that there will be an identical control system for the other electrode 14 as well.

The cable mechanism 23 includes a cable 26 coupled at one end to its associated electrode 14 and extending upwardly therefrom and over sheaves 28. The opposite end of cable 26 is connected to a drum 29 which may be reversibly driven by motor 22.

The control 21 is generally conventional and is coupled to conductor 18 for receiving a first signal functionally related to electrode voltage and a second signal functionally related to electrode current. Assuming the conductivity of the bath 24 remains the same, those skilled in the art will appreciate that the electrode current will be inversely related to the distance between the electrode 14 and bath 24 while electrode voltage will be directly related. More specifically, control 21 includes an isolation transformer 30 whose primary is connected to conductor 18 through resistor 32 so that a signal appears in the secondary of transformer 30 which is functionally related to the potential between electrodes 14 and ground. This signal is rectified and provided to control 21 though conductors 33. Also coupled to conductor 18 is a current transformer 34 which generates a current signal functionally related to electrode current. This signal is rectified and applied across resistor 36 so that a voltage signal functionally related to electrode current is applied to control 21 through conductors 38. Control 21 is operative to compare the voltage signals delivered through conductors 33 and 38 and to provide an output signal to motor 22 when the relationship between the input signals deviates from a preselected value. The output signal from control 21 will vary in magnitude and sense depending upon the manner and degree that the input signal relation deviates from the preselected value.

Should the gap between electrode 14 and melt 24 increase from a desired amount, electrode voltage will increase and electrode current will decrease and there will be corresponding changes in the signals at conductors 33 and 38. When these changes are sensed by control 21, the latter will then provide an error signal to motor 22 which becomes operative to lower the electrode 14 toward the bath 24 until the desired electrical conditions are again achieved. Conversely, should the electrode move closer to the bath than the preselected desired position, the electrode current will increase and electrode voltage will decrease. These parameter changes will be sensed by control 21 which will signal motor 22 to raise the electrode 14 until it is elevated to the desired position.

Another parameter affecting electrode voltage and current is the conductivity of the melt. Normally, the conductivity of tricalcium silicate, the principle constituent of the melt, will be about 175 mho/meter at 3200° F. However, it will be appreciated that in a continuous process, as molten material is withdrawn through tap 39, additional material 40 to be melted will be provided to the furnace from hoppers 41. However, the conductivity of the material varies from a relatively low value at its melting point to the value indicated above at the operating temperature of 3100° F. It will also be appreciated that the temperature of the melt is sensitive to the feed rate and particularly in the vicinity of the electrode tips. Should the material be fed too fast, therefore, so that there is a decrease in conductivity, the electrode current will decrease even though the gap between the electrode and the bath may be relatively short. This condition would be sensed by the control 21 which then attempts to lower the electrode 14 further so that the graphite electrode might tend to become immersed into the bath 30. The tricalcium silicate bath, however, is very reactive with carbon electrodes at temperatures of 2900° F.-3200° F. which is the normal operating range of the furnace. This reaction of lime and carbon forms calcium carbide in the melt. The formation of even very small amounts of this carbide renders the subsequent clinker useless as a cement making material because of deleterious effects it has upon the crystalline properties of solidified material. For this reason, the charge material 40 which is fed into furnace 10 from hopper 41 must be fed at a controlled rate through valve 42 so as not to lower the temperature of the melt below about 3200° F. For this purpose a control 43 is connected to receive electrode voltage and current signals. These signals are employed to determine the power delivered to the furnace 10 and to provide an output control signal functionally related thereto. The output signal is used to control the valve 42 which may take the form of a vibratory or screw feeder. This control is based upon the finding that the power consumed by the furnace is related to the material feed rate. If the material is fed too fast, the power drops off sharply and conversely increases from a preselected value if material is fed to slowly. Thus by measuring power delivered to the furnace, the material feed rate can be controlled to insure that the power is maintained within preselected limits and further to insure that the electrode tips do not make contact with the melt.

As the charge material 40 falls into the furnace, it will be influenced by the thermal convection currents generally flowing away from the electrodes toward the furnace walls. The location of the feed chutes may be used to provide layering of the charge on the top of the bath near the electrodes so that it is placed where it can advantageously use the superheat in the top layer of the melt for melting as it moves away from the arc contact zone toward the furnace walls. The ideally sized furnace bath crucible is one in which the superheat is completely transferred to the feed on the surface by the time the convection current has transported the melt to the refractory lining. When this condition is maintained, a portion of the charge 45 solidifies on the inner surface of the refractory lining 12 thereby providing a protective layer or self-lining. Because the melt 24 is highly corrosive when in contact with most known refractory materials, the self-lining 45 helps to prolong substantially the life of the furnace refractory 12.

In accordance with the method according to the preferred embodiment of the invention, a mixture of clay, which is principally silicon dioxide, and the waste product produced when phosphate rock is treated with sulfuric acid for the extraction of phosphorous are stored in hopper 41. This waste product consists principally of gypsum ($CaSO_4 2H_2O$). The mixture is fed into the furnace 10 at a rate controlled by valve 42. The electrodes are energized to provide a bath temperature of about 2900° F.-3200° F. At this temperature, the following chemical reactions occur:

$$3CaSO_4.2H_2O + SiO_2 \rightarrow CaO.SiO_2 + 3SO_3 \uparrow + H_2O$$

This reaction is rapid and virtually complete by the time the mixture of sulfate and silicous materials is melted. After the materials charged from hopper 41 into furnace 10 melt, the molten material 24 may be tapped through the tap hole 39. Accordingly, this process can be continuous and permits the recovery of $SO_3$ by means of a smoke hood 46 which is connected at one end to an opening 47 in the roof 16 of the vessel 10 and whose other end is connected to a storage facility 48. Means may also be provided to produce a slight suction at the lower end of hood 46 to facilitate the collection of $SO_3$ gas. After recovery in facility 48, the $SO_3$ gas may subsequently be used for the production of sulfuric acid which may then be used in the phosphate rock treating process.

In one example of the method according to the invention, a rectangular furnace 1' by 2' in plan view and 1' deep was employed. Two 3 inch diameter electrodes were connected to a 150 kVA power source with the furnace power requirements being 50 kW. The furnace bath temperature was maintained at about 3200° F. and the voltage between each electrode and ground was maintained at about 45 volts. By-product gypsum and clay were fed into the furnace in the following proportions at the rate of 50 pounds per hour:
  CaO: 73%
  $SiO_2$: 24%
  $Fe_2O_3$: 3%
Satisfactory Portland cement composition according to Table 1 was produced with the electrodes being maintained a slight distance above bath level.

TABLE 1

|  | Melt 2 | Melt 3 |
|---|---|---|
| $SiO_2$ | 26.9 | 26.6 |
| $Al_2O_3$ | 7.1 | 10.3 |
| $Fe_2O_3$ | 3.2 | 3.4 |
| CaO | 59.1 | 57.2 |
| MgO | 4.3 | 2.4 |
| $SO_3$ | 0.23 | 0.21 |
| L.O.T. | 0.11 | 0.01 |

The charge constituents may compose a variety of lime and silica bearing materials such as limestone, aragonite, blast and phosphorus furnace slags, etc.

While only a single embodiment of the invention has been illustrated and described, it is not intended to be limited thereby but only the the scope of the appended claims.

We claim:

1. A method of producing Portland cement composition melts in an electric arc furnace including the steps of:

charging a mixture of first material containing calcium oxide and a second material containing silicon dioxide into an electric arc furnace having at least two carbon electrodes, energizing the electrodes to maintain a temperature in the furnace of about 3200° F., feeding said materials into the furnace at such a rate that the conductivity thereof remains about 175 mho per meter, and maintaining a ratio of the electrode voltage to current at a level that ensures that the electrode will remain in close proximity to, but out of contact with the molten furnace bath.

2. The method set forth in claim 1 where the ratio of calcium oxide to silicon dioxide is less than 3.0 and the bath is essentially a mixture of tricalcium silicate and dicalcium silicate.

3. The method set forth in claims 1 or 2 wherein said electrodes are formed of carbon.

4. A method of producing tricalcium silicate in an electric arc furnace including the steps of charging a mixture of calcium sulfate containing material and a silicon dioxide containing material into an electric arc furnace having at least one electrode, energizing the electrode to maintain a temperature in the furnace of about 2900°–3200° F., recovering $SO_3$ gas generated from the melted materials and recovering material which is principally tricalcium silicate from the melt.

5. The method set forth in claim 4 wherein said calcium sulfate containing material is the waste product of the treatment of phosphate rock with $H_2SO_4$.

6. The method set forth in claim 5 wherein said silicon dioxide containing material is clay.

7. The method set forth in claims 4, 5, or 6 and including the step of feeding said mixture into the furnace at a rate which does not affect a material change in power consumption from preselected limits.

8. The method set forth in claim 7 wherein said electrode is carbon, and including the step of maintaining a ratio of the electrode voltage to current at a level that ensures that the electrode will remain in close proximity to but out of contact with the molten furnace bath.

* * * * *